United States Patent [19]

Berry

[11] 4,351,048
[45] Sep. 21, 1982

[54] HIGH DENSITY INFORMATION DISC LUBRICANTS

[75] Inventor: David A. Berry, Columbus, Ohio

[73] Assignee: RCA Corporation, New York, N.Y.

[21] Appl. No.: 297,053

[22] Filed: Aug. 27, 1981

[51] Int. Cl.³ .............................. G11B 3/70; C07F 7/18
[52] U.S. Cl. .................................. 369/288; 556/425; 369/286; 252/34; 252/49.6; 358/128.5; 346/137; 346/135.1; 428/64; 428/65; 428/447; 428/451; 428/408; 428/161
[58] Field of Search .................. 428/64, 65, 447, 451, 428/164, 163, 161, 408; 252/49.6, 34; 556/425; 358/128.5; 369/286, 288; 346/137, 135.1

[56] References Cited

U.S. PATENT DOCUMENTS

| | | | |
|---|---|---|---|
| 3,833,408 | 9/1974 | Matthies | 117/217 |
| 4,127,872 | 11/1978 | Lo | 358/128 |
| 4,216,970 | 8/1980 | Wang et al. | 274/42 R |
| 4,275,101 | 6/1981 | Wang et al. | 369/286 |

Primary Examiner—George F. Lesmes
Assistant Examiner—Alexander S. Thomas
Attorney, Agent, or Firm—Birgit E. Morris

[57] ABSTRACT

High density information discs are lubricated with a silyl quaternary ammonium salt of the formula

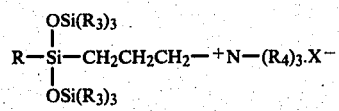

wherein R is a lower alkyl group of 1–5 carbon atoms; $R_3$ is methyl or ethyl; $R_4$ is an alkyl group of 1–12 carbon atoms and X is $-OSO_2-(CH_2)_nCH_3$ wherein n is an integer of 5–12. Discs lubricated with this lubricant exhibit improved stability to high temperature, high relative humidity environments.

3 Claims, No Drawings

HIGH DENSITY INFORMATION DISC LUBRICANTS

This invention relates to an improved high density information disc lubricant. More particularly, this invention relates to the use of silyl quaternary ammonium salts as high density information disc lubricants.

BACKGROUND OF THE INVENTION

U.S. Pat. No. 3,833,408 to Matthies, herein incorporated by reference, describes the application of methyl alkyl siloxane compositions as lubricants for conductive information discs comprising a molded plastic disc having audio and video signal information in the form of geometric variations in a spiral groove. These discs are coated first with a conductive material which acts as a first electrode of a capacitor, then with a dielectric layer and a final layer of lubricant. A metallized stylus acts as a second electrode of the capacitor. The information signals are monitored by the stylus which notes changes in capacitance between the stylus and the disc surface as the information signals, in the form of a surface relief pattern, pass beneath the stylus.

Further developments in this system have produced a disc which is made of a conductive plastic material, e.g., a polyvinylchloride homopolymer or copolymer resin containing sufficient amounts of conductive carbon particles so that the disc can provide capacitance readout. The plastic resin at the surface of the disc surrounds the carbon particles to produce a dielectric surface layer. This development has eliminated the need for separate coatings of metal and a dielectric layer on the surface of the disc.

The stylus, formerly made of metallized sapphire, has also been improved so that metallized diamond can be used. Diamond is a harder, longer wearing material than sapphire but also requires improved lubrication of the disc surface.

High density information discs are also being developed which do not require a grooved surface, the stylus being maintained in synchronization with the information pattern track by means of electrical signals rather than by groove walls.

These changes in the materials used for the high density information discs and the stylus have changed the requirements for the lubricant system and improved lubricants are required. Wang et al, in U.S. Pat. No. 4,275,101, have described an improved lubricant system which comprises a fractionated, purified methyl alkyl siloxane of the formula

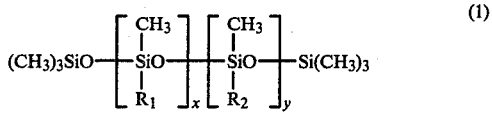

(1)

wherein $R_1$ and $R_2$ are alkyl groups of 4–20 carbon atoms, x is an integer of 2–4 and y is an integer of 0–2 and wherein the sum of x and y is 4 or less. These lubricants have improved long term stability and resistance to temperature and relative humidity changes in the atmosphere.

High density information discs of the above type are subject to a phenomenon called carrier distress. Since the polyvinylchloride composition from which the discs are made is a heavily filled, heavily lubricated and heavily plasticized composition, degradation products that are produced during molding and on storage from reactions of the disc materials and excess, incompatible additives, bleed to the surface of the disc, forming a thin layer of organic and inorganic materials. This layer interferes with playback by collecting in the grooves or on the surface and by building up on the stylus. The result can be locked grooves, or dropouts of information as the disc is played. This problem has been somewhat alleviated by cleaning the discs after molding and prior to lubrication with aqueous solutions which remove at least some of the surface layer. However, with time, additional materials bleed to the surface of the disc. This bleedout can be accelerated by exposure of the disc to high temperatures, on the order of about 100° F., and high relative humidity, 90 percent and above. Lubrication of the disc has heretofore had little or no effect on reducing carrier distress. A lubricant that can uniformly lubricate the surface of the disc without the need for a cleaning step would reduce the cost of manufacture. A lubricant that would reduce carrier distress in addition, would be highly desirable.

SUMMARY OF THE INVENTION

I have discovered that certain silyl quaternary ammonium salts are lubricants which reduce carrier distress without adverse effects on the playback performance or long term stability of the surface of high density information records and that can be applied to as pressed discs.

DETAILED DESCRIPTION OF THE INVENTION

The silyl quaternary ammonium salts suitable for use in the present invention have the formula

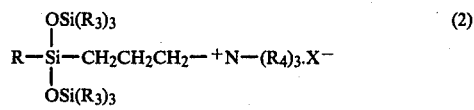

(2)

wherein R is a lower alkyl group of 1–5 carbon atoms; $R_3$ is methyl or ethyl; $R_4$ is an alkyl group of 1–12 carbon atoms and X is $-OSO_2-(CH_2)_nCH_3$ wherein n is an integer of 5–12.

The above silyl quaternary ammonium salts greatly improve the stability of high density information discs, particularly after exposure of the disc to high temperature and high relative humidity. The exact reason for this improvement is unknown at the present time.

The lubricants of the invention may be applied by dipping or spraying from a solution, e.g., in heptane, to the surface of the disc in known manner. After evaporation of the solvent the lubricant remains on the surface of the disc as a thin conformal coating. The present lubricant once applied is stable with respect to atmospheric effects and provides high uniformity and reproducibility of lubrication for high density information discs. This system provides excellent lubricity as measured by low stylus and disc wear and excellent playback performance both on initial play and particularly after stressing.

The invention will be further illustrated by the following Example but the invention is not to be limited to the details described therein. In the Example, percent is by weight unless otherwise noted.

Carrier distress time is measured by adding the amount of time in seconds (but discounting intervals of less than 10 microseconds) during disc playback when the r.f. output of the player arm is less than 150 millivolts peak to peak, and the time when the r.f. output gives above 8.6 megahertz or below 3.1 megahertz in frequency, indicating a defect. Such defects are noted by the viewer as dropouts. The present acceptable level of carrier distress for a video disc is 3 seconds in one hour of playback time.

EXAMPLE

A molding composition was prepared by mixing 78 parts of Geon 110×346 polyvinylchloride of the B. F. Goodrich Company; 13 parts of Ketjenblack EC carbon black of the Armak Company; 1.5 part of dibutyltin-β-mercaptopropionate commercially available as T35 from M & T Chemical Company, Inc.; 1.0 part of Mark 275 stabilizer of Argus Chemical Co., a dibutyltin maleate stabilizer; 2.0 parts of Acryloid K-147 and 0.75 part of Acryloid K-275, acrylic modifiers of Rohm & Haas Co.; 0.5 part of Loxiol G-30 and 0.25 part of Loxiol G-70 lubricants of Henkel International GmbH; 1.0 part of calcium stearate and 3.0 parts of diundecyl phthalate.

Video discs were compression molded from the above composition at about 360° F. (182.2° C.).

A control group of six discs was lubricated in the standard manner by spraying with the fractionated methyl alkyl siloxane as in Formula (1) above as a 0.06 percent solution in heptane.

A second group of six discs was lubricated by spraying as a 0.06 percent solution in heptane with a lubricant of the formula

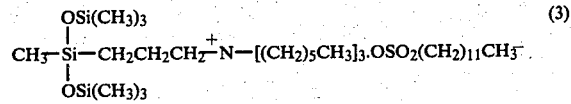 (3)

The discs were played once, then stressed by storing for one hour in a chamber maintained at 100° F. and 95 percent relative humidity and played again. The carrier distress was measured for each disc. The data, normalized to seconds of carrier distress for one hour of play, are summarized in the Table below.

| | Carrier Distress, sec./hr. of playback | | | |
| | Initial Play | | After Stressing | |
| | Median | Range | Median | Range |
| Control | 0.25 | 0.12–1.09 | 1354 | 309–1973 |
| Example | 0.27 | 0.12–0.38 | 3.9 | 1.74–9.7 |

It is apparent that the present lubricant greatly improves the playback of as pressed discs over the Control discs after stressing.

I claim:

1. In a high density information record adapted for use with a playback stylus to effect recovery of signals occupying a bandwidth of at least several megahertz when relative motion at a desired rate is established between said record and said stylus, said record compising a disc of a conductive material containing an information track constituted by a surface relief pattern in said track to accommodate recovery of signals of said bandwidth upon establishment of relative motion at said rate, said record coated with a lubricant, the improvement comprising employing as said lubricant a silyl quaternary ammonium salt lubricant having the formula

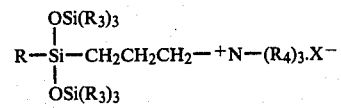

wherein R is a lower alkyl group of 1–5 carbon atoms; $R_3$ is methyl or ethyl; $R_4$ is an alkyl group of 1–12 carbon atoms and X is $-OSO_2-(CH_2)_nCH_3$ wherein n is an integer of 5–12.

2. A record according to claim 1 wherein said silyl quaternary ammonium salt lubricant has the formula

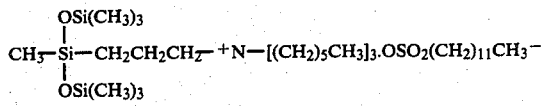

3. A record according to claim 1 or 2 wherein said disc is made from a carbon-loaded polyvinylchloride composition.

* * * * *